United States Patent [19]

Thompson

[11] Patent Number: 4,751,971

[45] Date of Patent: Jun. 21, 1988

[54] AUTOMATIC AUGERING DEVICE AND METHOD

[76] Inventor: Jimmie S. Thompson, P.O. Box 999, Navasota, Tex. 77868

[21] Appl. No.: 934,100

[22] Filed: Nov. 24, 1986

[51] Int. Cl.[4] .................. E21B 7/02; E21B 10/44; A01C 5/04

[52] U.S. Cl. .................. 175/57; 175/24; 175/51; 175/203; 111/2

[58] Field of Search .......... 175/57, 161, 162, 27, 175/24, 203, 51; 111/2

[56] References Cited

U.S. PATENT DOCUMENTS

| | | | |
|---|---|---|---|
| 3,406,765 | 10/1968 | Alexander | 175/51 |
| 3,593,809 | 7/1971 | Derry | 175/51 |
| 3,752,242 | 8/1973 | Gremillion | 175/108 |
| 3,756,330 | 9/1973 | Russell, Jr. | 175/162 |
| 3,813,171 | 5/1974 | Teach et al. | 356/152 |
| 4,482,960 | 11/1985 | Pryor | 364/424 |
| 4,575,522 | 3/1986 | Reiger et al. | 47/78 |

FOREIGN PATENT DOCUMENTS 0211915  4/1968  U.S.S.R. .................. 111/2
0309672  9/1971  U.S.S.R. .................. 111/2

Primary Examiner—James A. Leppink
Assistant Examiner—Terry Lee Melius
Attorney, Agent, or Firm—Arnold, White & Durkee

[57] ABSTRACT

A mobile automatic augering device, capable of augering a hole, entrapping a volume of earth removed from the hole to create a work space above the hole, and then backfilling the hole with the removed earth is disclosed. The present invention is characterized by an augering canister which contains a reversably rotatable auger within it. In operation, the canister is lowered to the earth. An auger is then rotated and lowered through an open, lower end into the earth. Once the auger has been lowered to a predetermined depth, the rotation is stopped, and the auger is raised back up into the canister, thereby entrapping the augered earth in the canister. The canister is raised a predetermined distance so that a work space, between the bottom of the canister and the surface of the earth is formed. After a set time period, the auger is rotated within its canister in an opposite direction, thereby dumping the entrapped earth into the hole to backfill the hole.

16 Claims, 3 Drawing Sheets

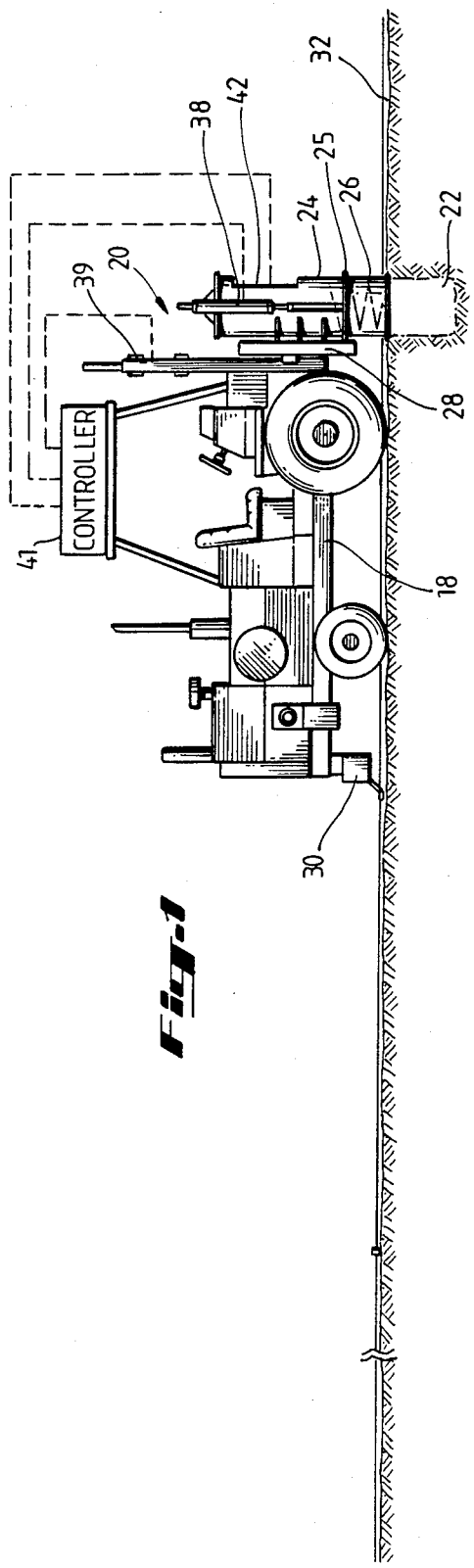
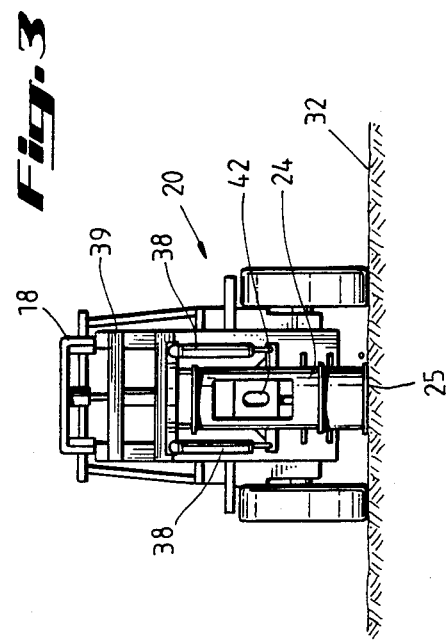
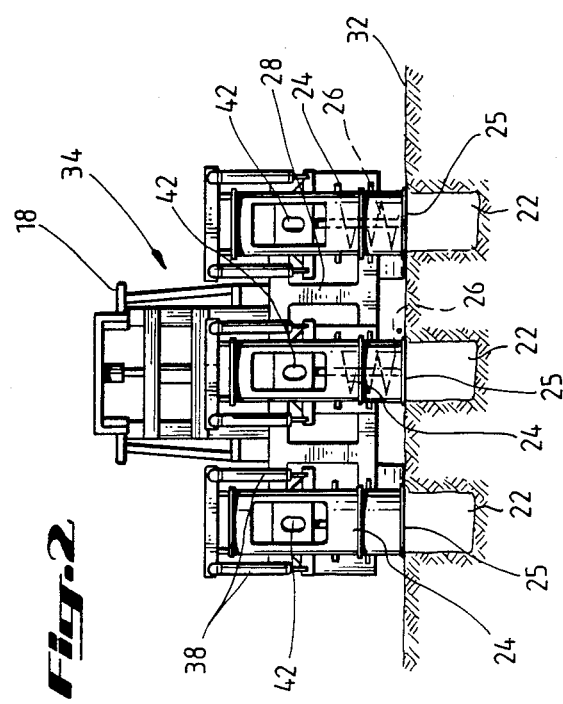

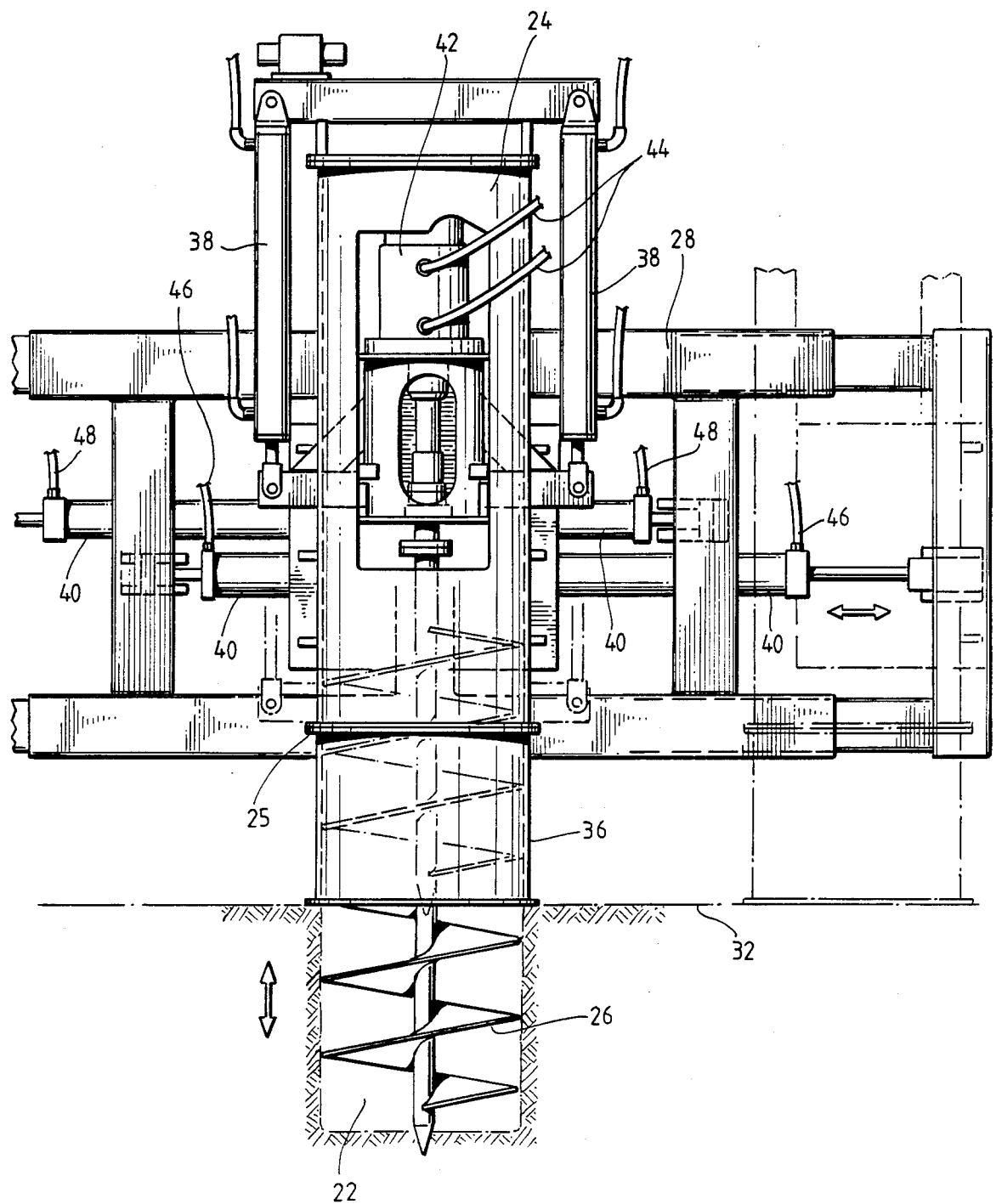

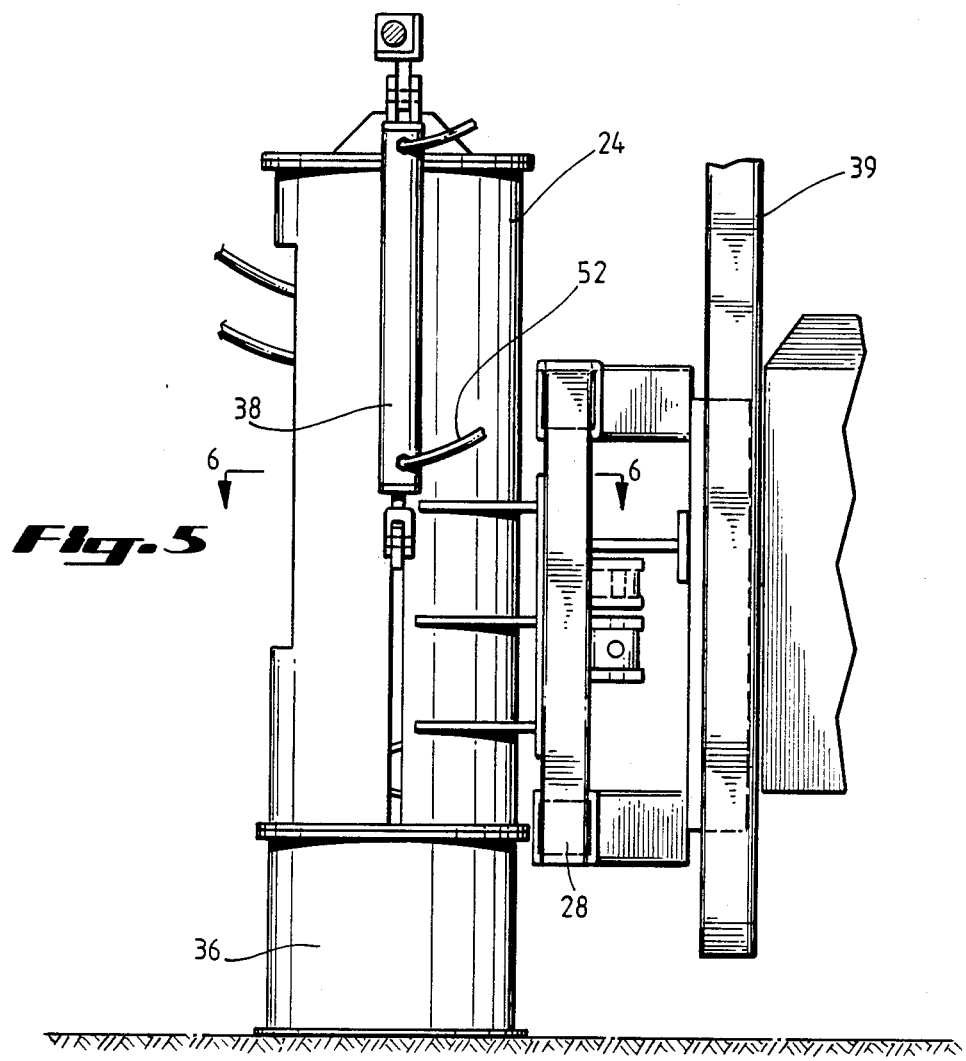
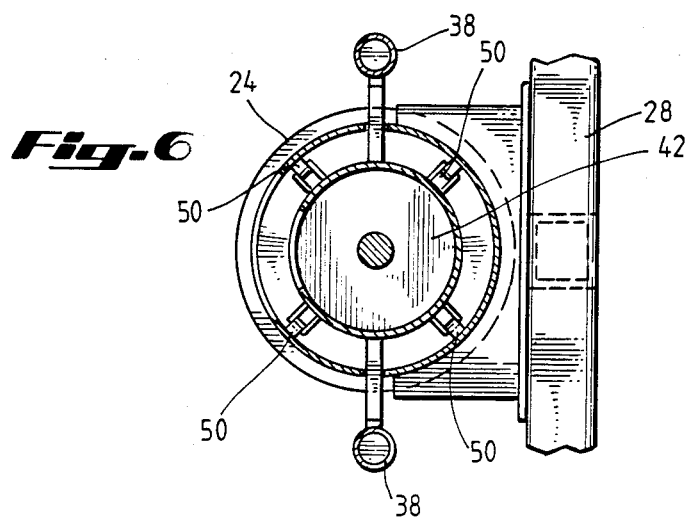

AUTOMATIC AUGERING DEVICE AND METHOD

BACKGROUND OF THE INVENTION

The present invention relates generally to a system for augering a hole in the surface of the earth, retaining the soil which is removed from the hole, and then automatically backfilling the hole with the displaced soil. More particularly, the present invention relates to an apparatus which automatically augers a plurality of holes into the surface of the earth and entraps the soil removed from the holes so that a separate root control bag, or container, may be placed into each hole. Once the root control bags have been placed into the holes, the device then automatically drops the earth removed from the holes into root control bags within the holes.

When holes are augered into the earth, it is often so that an object may be placed in the hole. It is often then desirable to immediately backfill the hole with the removed earth or soil. Many devices are known in the art which auger a hole and place the earth removed from the hole immediately about the edge of the hole on the surface of the earth. Typically, the hole is then backfilled manually. This general approach, however, has proven to be expensive, labor intensive, and extremely time consuming, especially when a large number of holes have to augered and then backfilled.

Typically, when plants are grown in the field for subsequent transplanting, it has proven to be very expensive to auger a multitude of holes, plant seeds or seedlings in the holes, and then backfill the holes by hand. Similarly, when root control bags are used, it is likewise very expensive to auger a hole, place the bag in the hole, and then manually backfill the bag in the hole. The present invention, however, has made it possible to carry out such operations with large savings of time and expense. The invention, therefore, has particular application to the plant growing or nursery industry. A recent development in that industry involves confining the roots of a growing plant by a root control bag. This development is described in U.S. Pat. No. 4,574,522 to Reiger et al. When operating according to the Reiger concept, a hole is excavated in the earth, a non-woven, porous, fabric root control bag is inserted into the hole, and the hole is then backfilled manually with the earth which has previously been in the hole, thereby filling the root control bag. A seed or seedling is planted in the earth contained within the bag.

While the process of the Reiger patent has certain advantages over the prior art, it is nevertheless marked by high labor costs and excessive time requirements.

SUMMARY OF THE INVENTION

The present invention attacks the previously unsolved problems of the prior art by providing apparatus and methods which auger and backfill holes in a fraction of the time previously required. More particularly, the present invention provides an apparatus which is capable of automatically augering and backfilling several holes at the same time, and also creating a pattern of holes spaced a predetermined distance apart both longitudinally and laterally in a field.

In accordance with the present invention, a mobile automatic augering system is used to form a hole in the earth so that an object may be placed in the hole, and then to automatically backfill the hole with the cuttings. An apparatus embodiment of the invention broadly comprises an auger, a housing or canister containing the auger, and a supporting frame. The housing or canister is mounted on the frame, and the auger is disposed within the housing or canister. The frame is capable of vertically raising and lowering the canister into, and out of, contact with the surface of the earth. Drive means are also provided to rotate the auger within the canister in both a clock-wise and counter clock-wise rotation. In a preferred embodiment of the present invention, a hydraulically driven motor is used as the drive means. Suitable means are also provided to raise and lower the auger beneath the canister while the auger is rotating.

In a preferred form, the apparatus according to the present invention is designed to automatically displace the augering canister a predetermined lateral distance along a predetermined path once the apparatus has augered and then backfilled a hole. This feature of the invention makes it possible to develop a preselected pattern of holes throughout a given field or area.

In one specific embodiment of the present invention, the apparatus lowers the frame attached to the canister until an open end of the canister contacts the surface of the earth. The auger contained within the canister is then rotated and lowered through the open end to a predetermined depth, thereby displacing a volume of earth along the auger. Once the auger has been lowered beneath the canister to a predetermined depth, the rotation is stopped and the auger is raised back up into the canister, thereby entrapping the earth auger from the hole within the canister. The apparatus then raises the canister to a predetermined distance above the surface of the earth so that workers may place an object in the newly formed hole. Following placement of the object, the apparatus automatically reverses the rotational direction of the auger within the canister, thereby dumping the entrapped earth back into the hole.

In a preferred embodiment of the present invention, a plurality of augering canisters, preferably three canisters, are disposed on a common moveable frame. In this embodiment, a separate auger is contained within each canister; and the frame is adjustable in order to vary the lateral distances between the canisters disposed on it. In operation, the frame is positioned above the surface of the earth where holes are to be augered. The frame is then lowered until an open lower end of each canister contacts the surface of the earth. Each auger is then rotated within its respective canister in a first direction while it is being lowered into the earth to a predetermined depth. Each auger is preferably rotated and lowered independently of the positions or movements of each of the other augers. Once each auger has been augered into the earth to the predetermined depth, that auger's rotation is stopped, and the auger is then raised back up into its respective canister, thereby entrapping the volume of earth, or cuttings, displaced from the hole within the canister. When each auger has augered to its predetermined depth and has been raised back up into its respective canister, the frame supporting the canister is automatically raised above the surface of the earth. After a predetermined time period, each auger is rotated in a second direction, opposite the first direction, so that the earth entrapped within its respective canister falls back into the hole directly beneath the canister, thereby backfilling the hole. The assembly of augers and canisters may then automatically advance a predetermined distance along a predetermined path and may await a signal from the operator before repeating the procedure.

In yet another embodiment of the present invention, a root control bag is placed in each hole formed by the automatic augering apparatus so that the apparatus automatically backfills the bags placed in the holes with the earth removed from the holes.

In operation, an apparatus according to the present invention has been able to auger and backfill three holes in sandy soil every fifty seconds.

As previously noted, the present invention also includes a method aspect which involves automatically augering and backfilling holes.

BRIEF DESCRIPTION OF THE DRAWINGS

FIG. 1 is a side view of an automatic augering device according to the present invention.

FIG. 2 is a rear view of an alternate embodiment of an automatic augering device according to the present invention.

FIG. 3 is a rear view of the automatic augering device depicted in FIG. 1.

FIG. 4 is a detailed view of a motor, augering canister, and auger mounted on a frame which incorporates the present invention.

FIG. 5 is a side view of a single augering canister and frame according to the present invention.

FIG. 6 is a top view of a single augering canister and frame according to the present invention.

DETAILED DESCRIPTION OF THE PREFERRED EMBODIMENT

Referring to FIG. 1, a mobile automatic augering system 20, used to form a hole 22 in the surface of the earth 32 so that an object may be placed in the hole 22, and then to automatically backfill the hole 22 with cuttings, is shown. The mobile automatic augering system 20 is comprised of several different types of components: an augering canister, or housing, 24; an auger 26, disposed within the housing 24; a frame 28, to which housing 24 is mounted; means 38 to raise and lower the auger 26 beneath the bottom 25 of augering canister 24; means 39 to raise and lower the augering canister 24 relative to the frame 28; and means 42 to rotate auger 26.

In a preferred embodiment of the present invention, frame 28 will be mounted on a tractor 18, which may be further characterized by an apparatus 30 which automatically controls advancement of tractor 18 so that the tractor 18 is advanced a predetermined distance directionally along a predetermined path.

In a preferred embodiment of the present invention, means 42 to rotate auger 26 is a hydraulically driven motor which is capable of rotating auger 26 in both a clockwise and counter-clockwise direction. Means 39 to raise and to lower the augering canister 24 is a hydraulically driven piston and cylinder arrangement. In yet another embodiment of the present invention means 42 may be mechanical means to rotate auger 26. Similarly, means 38 to lower auger 26 beneath the bottom 25 of canister 24, and then raise auger 26 back up into canister 24, may also be a pair of hydraulic piston and cylinder combinations. The particulars of hydraulically driven motors and piston and cylinder combinations are well known in the art and need not be discussed here.

A preferred embodiment further comprises a controller 41 programmed to automatically cause the auger 26 to auger the hole 22 to a predetermined depth by lowering the auger 26 beneath its canister 24 while the auger 26 is rotating in a first direction. Thereafter, the controller 41 may cause the auger 26 to raise back into its canister 24 thereby entrapping in the canister 24 the earth augered from the hole 22. The controller 41 may then cause the auger 26 to rotate in a second opposite direction thereby back-filling the hole 22 with the augered earth.

FIG. 3 is a rear view of the mobile automatic augering device 20 depicted in FIG. 1. Referring to FIG. 3, the augering canister 24 is shown in position to auger a hole into the surface of the earth 32.

Referring now to FIG. 2, an alternate embodiment and apparatus according to the present invention is shown. In this embodiment of the present invention, a plurality of augering canisters 24, and preferably three canisters 24, are shown mounted to a common frame 28. In this embodiment, the frame 28 is adjustable in order to vary the lateral distance between each augering canister 24. Each augering canister 24 will have a separate auger 26 disposed within it.

Referring again to FIGS. 1 and 3, in operation an apparatus 20 according to the present invention will be positioned over the location where a hole 22 is to be augered. Means 39 to lower canister 24 relative to frame 28 will then be activated so that the bottom 25 of augering canister 24 contacts the surface 32 of the earth. Fluid motor 42 will then be activated so that auger 26 is rotated. Means 38 to lower auger 26 beneath the bottom 25 of augering canister 24 will then displace auger 26 downwardly to a predetermined depth beneath the surface 32 of the earth.

Once auger 26 has been lowered to its predetermined depth, fluid motor 42 will be deactivated so that auger 26 no longer rotates. Means 38 to raise and lower auger 26 will then displace auger 26 upwardly, back up into augering canister 24, thereby entrapping a volume of earth, or cuttings, within the augering canister 24.

Once auger 26 has been displaced back up into augering canister 24, means 39 will then displace augering canister 24 upwardly to provide a clearance between the bottom 25 of augering canister 24 and the surface 32 of the earth so that workers may place an object into hole 22. After a predetermined time period, fluid motor 42 will again be activated so that auger 26 is rotated in a second, opposite direction within augering canister 24, thereby dumping the cuttings entrapped within augering canister 24 back into hole 22

In an alternate embodiment of the present invention, depicted in FIG. 2, a plurality of augering canisters 24 are disposed upon a common frame 28. In operation of this embodiment of the present invention, frame 28 lowers canisters 24 until the bottom ends 25 of canister 24 contact the surface 32 of the earth. Fluid motors 42 are then activated so that each auger 26 within its respective augering canister 24 is rotated independently of each of the other augers 26. Means 38 then displace each auger 26 downwardly, beneath each bottom end 25 of its respective augering canister 24, independently of the downward displacement of each other auger 26. Each auger 26 is displaced downwardly until each au9er 26 has been displaced a predetermined distance beneath the bottom end 25 of its respective augering canister 24. At this point, the fluid motor 42 of the particular auger 26 is deactivated so that auger 26 no longer rotates. When each auger 26 has been displaced downwardly to its predetermined depth, and all fluid motors 42 have been deactivated so that none of the augers 26 are rotating, each means 38 to raise each auger 26 is activated so that each auger 26 is withdrawn upwardly and back into its respective augering canister 24, thereby entrapping a separate volume of earth within each augering canister 24. When all augers 26 have been withdrawn into their respective augering canisters 24, frame 28 raises all augering canisters 24 to a predetermined distance above the surface 32 of the earth, thereby creating a clearance between each bottom end 25 of each augering canister 24 and the surface of the earth 32. Workers may then place objects into the newly formed holes 22. After a predetermined period of time, each fluid motor 42 is again activated so that each auger 26 within its respective augering canister 24 is rotated in a second opposite direction, thereby releasing the cuttings from the augering canisters 24 to backfill the holes 22.

The mobile automatic augering device 34 may then be displaced automatically to a predetermined distance along a predetermined path so that the procedure may be repeated.

Referring now to FIG. 4, a single auger 26 and its respective augering canisters 24, of the embodiment depicted in FIG. 2, is shown in detail. Means 40, which may preferably be hydraulic piston and cylinder combinations are used to vary the lateral distance between each augering canister 24. Fluid conduits 44 are used to carry hydraulic fluid to fluid motor 42 which in turn rotates auger 26.

In yet another embodiment of the present invention, the diameter of a housing extension 36 may be varied when the auger 26 diameter is varied. Fluid conduits 46 and 48 are used to supply hydraulic fluid to means 40 to vary the lateral distance between the augering canisters 24. In yet another preferred embodiment of the present invention, common fluid pumps are used to supply the hydraulic fluid necessary to activate means 42 to rotate auger 26; means 38 to lower auger 26 beneath the bottom end 25 of augering canister 24; and means 40 to vary the lateral distance between each augering canister 24.

Referring now to FIGS. 5 and 6, FIG. 5 shows a side view of an augering canister 24 according to the present invention, while FIG. 6 is a top view of a section taken along the vertical length of the augering canister 24. Referring specifically to FIG. 6, guides 50 may be used to keep fluid motor 42 in position along the longitudinal center line of cylinder 24 as fluid motor 42 is raised and lowered by means 38.

Various modifications and improvements may be made to the disclosed embodiments without departing from the overall scope and spirit of the present invention. For example, different methods of raising and lowering frame 28, or auger 26 relative to housing 24 may be used.

Having, therefore, fully and completely disclosed the best mode of my invention, I now claim:

1. A mobile augering apparatus, comprising:
a plurality of rotationally reversible augers each having a longitudinal axis and being operable to drill a hole in the earth;
a separate augering canister for each said auger, each said canister housing its respective said auger within it to allow its said auger to be longitudinally and rotationally moveable within said canister, each said canister being further open at an end to enable its said auger to enter the earth beneath said canister and to lift cuttings from the earth into said canister;
a laterally moveable frame supporting each said canister, said frame being capable of vertically raising and lowering each said canister; and
means to lower each said auger beneath its respective canister and return the lowered augers into position within its respective canister.

2. The apparatus according to claim 1, including means to displace said apparatus a predetermined lateral distance.

3. The apparatus according to claim 2, including means to direct said apparatus along a predetermined path as said apparatus is laterally displaced.

4. The apparatus according to claim 1, further comprising a controller programmed to automatically cause the auger to auger a hole to a predetermined depth by lowering the auger beneath its canister while the auger is rotating in a first direction; thereafter raise the auger back into its canister thereby entrapping the earth augered from said hole in the canister; and then rotate the auger in a second opposite direction thereby backfilling the hole with the augered earth.

5. The apparatus according to claim 1, comprising at least three said augering canisters, each said canister having a separate auger contained within it, said canisters being disposed on said frame.

6. The apparatus according to claim 5, wherein each said auger within each said canister is independently rotatable and longitudinally moveable with respect to every other auger so as to independently auger a hole in the earth, and be independently raised back up into its respective canister regardless of the position or attitude of any of the other augers, thereby entrapping the volume of earth augered from its respective said hole in its respective said canister.

7. The apparatus according to claim 6, including means to raise said frame above the surface of the earth sufficiently to create a workspace between the canisters and said surface of the earth.

8. The apparatus according to claim 5, wherein each said auger is rotated by a hydraulic motor.

9. The apparatus according to claim 5, wherein each said auger is rotated by mechanical means.

10. A method of augering holes in the earth and then backfilling said holes with the augered earth, comprising the steps of:
positioning a plurality of augering canisters above the area where the holes are to be augered, each said canister containing a separate auger within it;
lowering said canisters until an open end of each said canister contacts the surface of the earth;
rotating each said auger within each said canister in a first augering direction, wherein each said auger is rotated independently of all other augers;
lowering each said rotating auger into the earth beneath its said canister to a predetermined depth;
independently stopping said rotation of each said auger when each said auger has reached its predetermined depth;
independently raising each said auger back into its said canister, thereby entrapping a volume of earth within each said canister and creating a plurality of holes in the surface of the earth beneath the said canisters;
lifting said canisters a predetermined distance above the surface of the earth; and
thereafter simultaneously rotating each said auger within its said canister in a second direction, opposite said first direction, so that said entrapped earth within each canister falls back into the hole beneath the said canister, thereby backfilling each hole.

11. The method according to claim 10, wherein at least three augering canisters, each said canister containing a separate auger within it, simultaneously but independently auger a separate hole regardless of the position or movement of each other auger.

12. The method according to claim 10, wherein each said canister is mounted on a moveable, adjustable frame; said frame being able to vary the linear distance between said canisters; said frame being further able to raise said canisters above the surface of the earth when each said auger and the earth displaced by said auger are raised into its respective canister.

13. The method according to claim 12, wherein said moveable frame is advanced a predetermined distance along a predetermined path when said augers have rotated in said secon direction, thereby backfilling said holes.

14. The method according to claim 10, wherein said method is performed so that a separate root control bag may be placed in each augered hole and then filled with the earth which was removed from the hole.

15. The method according to claim 12, wherein said augers are driven by a hydraulic motor; wherein said frame is adjustable and is raised and lowered by hydraulic rams; and wherein said augers are lowered beneath said canisters and are raised back up into said canisters by hydraulic rams.

16. The method according to claim 12, wherein said augers are driven by mechanical means; wherein said frame is adjustable and is raised and lowered by hydraulic rams; and wherein said augers are lowered beneath said canisters and are raised back up into said canisters by hydraulic rams.

* * * * *